(12) United States Patent
Rastegar et al.

(10) Patent No.: US 7,437,995 B2
(45) Date of Patent: Oct. 21, 2008

(54) AXIALLY COMPACT MECHANICAL IGNITER FOR THERMAL BATTERIES AND THE LIKE

(75) Inventors: Jahangir S. Rastegar, Stony Brook, NY (US); Richard Murray, East Patchogue, NY (US); Gary Chen, Succasunna, NJ (US); Raymond Michael Hartley, Abingdon, MD (US)

(73) Assignee: Omnitek Partners LLC, Bayshore, NY (US)

( * ) Notice: Subject to any disclaimer, the term of this patent is extended or adjusted under 35 U.S.C. 154(b) by 164 days.

(21) Appl. No.: 11/599,878

(22) Filed: Nov. 15, 2006

(65) Prior Publication Data

US 2008/0110365 A1 May 15, 2008

(51) Int. Cl.
*F42C 15/24* (2006.01)
*F42C 15/34* (2006.01)

(52) U.S. Cl. .................. 102/216; 102/247; 102/253
(58) Field of Classification Search .............. 102/216, 102/231, 234, 247, 252, 253
See application file for complete search history.

(56) References Cited

U.S. PATENT DOCUMENTS

| 559,495 | A | * | 5/1896 | Rapieff | 102/247 |
|---|---|---|---|---|---|
| 2,243,621 | A | * | 5/1941 | Denoix | 102/253 |
| 2,977,882 | A | * | 4/1961 | Jasse | 102/248 |
| 3,118,378 | A | * | 1/1964 | Jasse | 102/250 |
| 3,425,351 | A | * | 2/1969 | Fyfe | 102/207 |
| 3,814,018 | A | * | 6/1974 | Daniel | 102/253 |
| 3,842,740 | A | * | 10/1974 | Mirlesse | 102/487 |
| 4,212,245 | A | * | 7/1980 | Rusbach | 102/249 |
| 4,320,706 | A | * | 3/1982 | Rusbach | 102/249 |
| 4,449,455 | A | * | 5/1984 | Halssig | 102/234 |
| 4,487,127 | A | * | 12/1984 | Luebbers | 102/253 |
| 4,969,397 | A | * | 11/1990 | Gunther et al. | 102/233 |
| 4,991,510 | A | * | 2/1991 | Lubbers | 102/247 |
| 5,467,713 | A | * | 11/1995 | Roosmann et al. | 102/233 |
| 5,872,324 | A | * | 2/1999 | Watson et al. | 102/265 |
| 6,279,480 | B1 | * | 8/2001 | Roosmann | 102/272 |
| 6,536,347 | B1 | * | 3/2003 | Zacharin | 102/274 |

* cited by examiner

*Primary Examiner*—Bret Hayes (57) ABSTRACT

An inertial igniter including: a first member having a wall and internal cavity; a second member slidable in the internal cavity, a striker disposed thereon and a first concave portion; a third member slidable on an exterior surface of the wall, a second concave portion; biasing springs for biasing the first and second members in a direction opposite an acceleration; locking balls in the first and second concave portions for preventing movement of the second and third members when the acceleration time profile is below a predetermined threshold; and a percussion cap primer on the first member; wherein when the acceleration time profile is greater than the predetermined threshold the locking balls are released from the concave portions to first permit relative movement of the third member with the first member and after a time delay to permit relative movement of the second member with the first member.

27 Claims, 7 Drawing Sheets

AXIALLY COMPACT MECHANICAL IGNITER FOR THERMAL BATTERIES AND THE LIKE

GOVERNMENT RIGHTS

The U.S. Government has a paid-up license in this invention and the right in limited circumstances to require the patent owner to license others on reasonable terms as provided for by the terms of SBIR Grant No. DAAE30-03-C-1077 awarded by the Department of Defense on Jul. 17, 2006.

BACKGROUND OF THE INVENTION

1. Field of the Invention

The present invention relates generally to mechanical igniters, and more particularly to axially compact mechanical igniters for thermal batteries and the like.

2. Prior Art

Thermal batteries represent a class of reserve batteries that operate at high temperatures. Unlike liquid reserve batteries, in thermal batteries the electrolyte is already in the cells and therefore does not require a distribution mechanism such as spinning. The electrolyte is dry, solid and non-conductive, thereby leaving the battery in a non-operational and inert condition. These batteries incorporate pyrotechnic heat sources to melt the electrolyte just prior to use in order to make them electrically conductive and thereby making the battery active. The most common internal pyrotechnic is a blend of Fe and $KClO_4$. Thermal batteries utilize a molten salt to serve as the electrolyte upon activation. The electrolytes are usually mixtures of alkali-halide salts and are used with the $Li(Si)/FeS_2$ or $Li(Si)/COS_2$ couples. Some batteries also employ anodes of Li(Al) in place of the Li(Si) anodes. Insulation and internal heat sinks are used to maintain the electrolyte in its molten and conductive condition during the time of use. Reserve batteries are inactive and inert when manufactured and become active and begin to produce power only when they are activated.

Thermal batteries have long been used in munitions and other similar applications to provide a relatively large amount of power during a relatively short period of time, mainly during the munitions flight. Thermal batteries have high power density and can provide a large amount of power as long as the electrolyte of the thermal battery stays liquid, thereby conductive. The process of manufacturing thermal batteries is highly labor intensive and requires relatively expensive facilities. Fabrication usually involves costly batch processes, including pressing electrodes and electrolytes into rigid wafers, and assembling batteries by hand. The batteries are encased in a hermetically-sealed metal container that is usually cylindrical in shape. Thermal batteries, however, have the advantage of very long shelf life of up to 20 years that is required for munitions applications.

Thermal batteries generally use some type of igniter to provide a controlled pyrotechnic reaction to produce output gas, flame or hot particles to ignite the heating elements of the thermal battery. There are currently two distinct classes of igniters that are available for use in thermal batteries. The first class of igniters operate based on electrical energy. Such electrical igniters, however, require electrical energy, thereby requiring an onboard battery or other power sources with related shelf life and/or complexity and volume requirements to operate and initiate the thermal battery. The second class of igniters, commonly called "inertial igniters", operates based on the firing acceleration. The inertial igniters do not require onboard batteries for their operation and are thereby often used in high-G munitions applications such as in non-spinning gun-fired munitions and mortars.

In general, the inertial igniters, particularly those that are designed to operate at relatively low impact levels, have to be provided with the means for distinguishing events such as accidental drops or explosions in their vicinity from the firing acceleration levels above which they are designed to be activated. This means that safety in terms of prevention of accidental ignition is one of the main concerns in inertial igniters.

In recent years, new improved chemistries and manufacturing processes have been developed that promise the development of lower cost and higher performance thermal batteries that could be produced in various shapes and sizes, including their small and miniaturized versions. However, the existing inertial igniters are relatively large and not suitable for small and low power thermal batteries, particularly those that are being developed for use in miniaturized fuzing, future smart munitions, and other similar applications.

The need to differentiate accidental and initiation accelerations by the resulting impulse level of the event necessitates the employment of a safety system which is capable of allowing initiation of the igniter only during high total impulse levels. The safety mechanism can be thought of as a mechanical delay mechanism, after which a separate initiation system is actuated or released to provide ignition of the pyrotechnics. An inertial igniter that combines such a safety system with an impact based initiation system and its alternative embodiments are described herein together with alternative methods of initiation pyrotechnics.

Inertia-based igniters must therefore comprise two components so that together they provide the aforementioned mechanical safety (delay mechanism) and to provide the required striking action to achieve ignition of the pyrotechnic elements. The function of the safety system is to fix the striker in position until a specified acceleration time profile actuates the safety system and releases the striker, allowing it to accelerate toward its target under the influence of the remaining portion of the specified acceleration time profile. The ignition itself may take place as a result of striker impact, or simply contact or proximity. For example, the striker may be akin to a firing pin and the target akin to a standard percussion cap primer. Alternately, the striker-target pair may bring together one or more chemical compounds whose combination with or without impact will set off a reaction resulting in the desired ignition.

In addition to having a required acceleration time profile which will actuate the device, requirements also commonly exist for non-actuation and survivability. For example, the design requirements for actuation for one application are summarized as:

1. The device must fire when given a [square] pulse acceleration of 900 G±150 G for 15 ms in the setback direction.

2. The device must not fire when given a [square] pulse acceleration of 2000 G for 0.5 ms in any direction.

3. The device must not actuate when given a ½-sine pulse acceleration of 490 G (peak) with a maximum duration of 4 ms.

4. The device must be able to survive an acceleration of 16,000 G, and preferably be able to survive an acceleration of 50,000 G.

Figure 1:
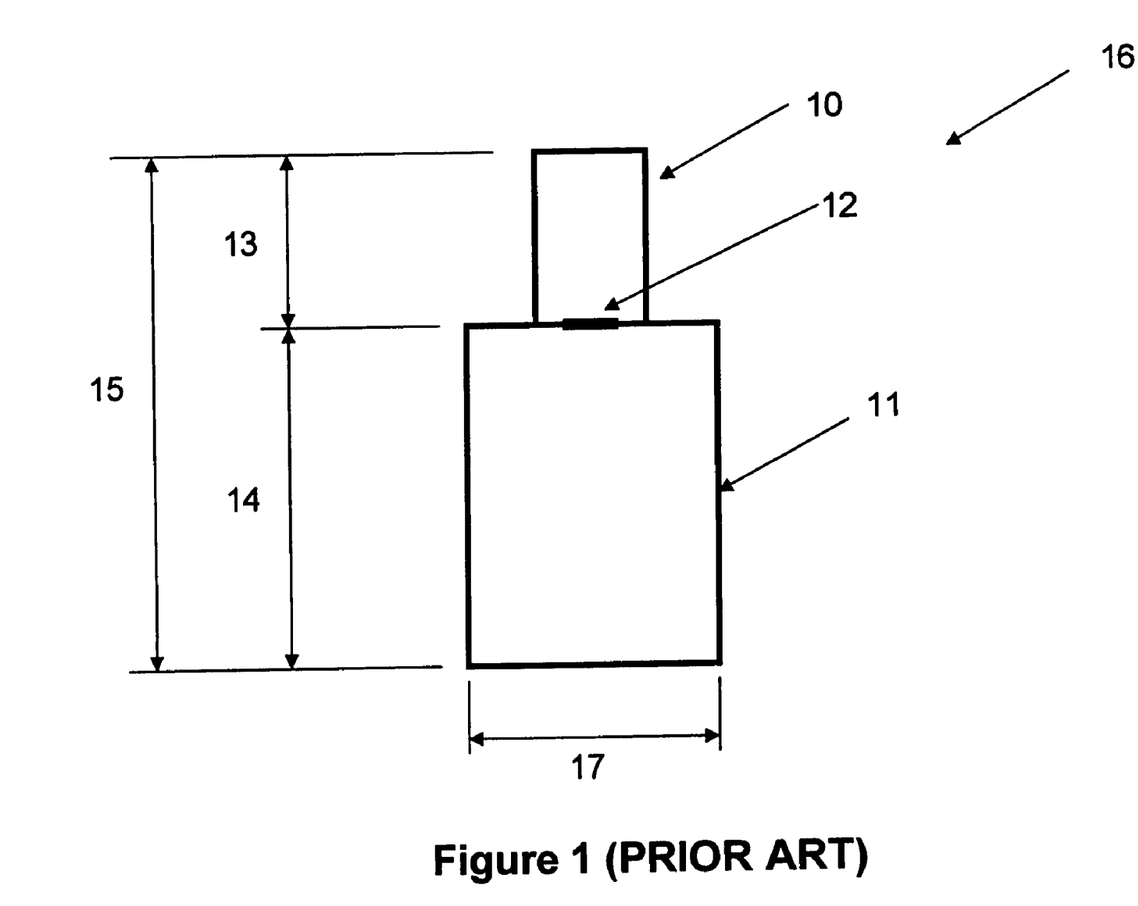
FIG. 1 illustrates a schematic of a cross-section of a thermal battery and inertial igniter assembly.

A schematic of a cross-section of a thermal battery and inertial igniter assembly is shown in FIG. 1. In thermal battery applications, the inertial igniter 10 (as assembled in a housing) is generally positioned above the thermal battery housing 11 as shown in FIG. 1. Upon ignition, the igniter initiates the thermal battery pyrotechnics positioned inside the thermal battery through a provided access 12. The total volume that the thermal battery assembly 16 occupies within munitions is determined by the diameter 17 of the thermal battery housing 11 (assuming it is cylindrical) and the total height 15 of the thermal battery assembly 16. The height 14 of the thermal battery for a given battery diameter 17 is generally determined by the amount of energy that it has to produce over the required period of time. For a given thermal battery height 14, the height 13 of the inertial igniter 10 would therefore determine the total height 15 of the thermal battery assembly 16. To reduce the total volume that the thermal battery assembly 16 occupies within a munitions housing, it is therefore important to reduce the height of the inertial igniter 10. This is particularly important for small thermal batteries since in such cases the inertial igniter height with currently available inertial igniters can be almost the same order of magnitude as the thermal battery height.

Figure 2:
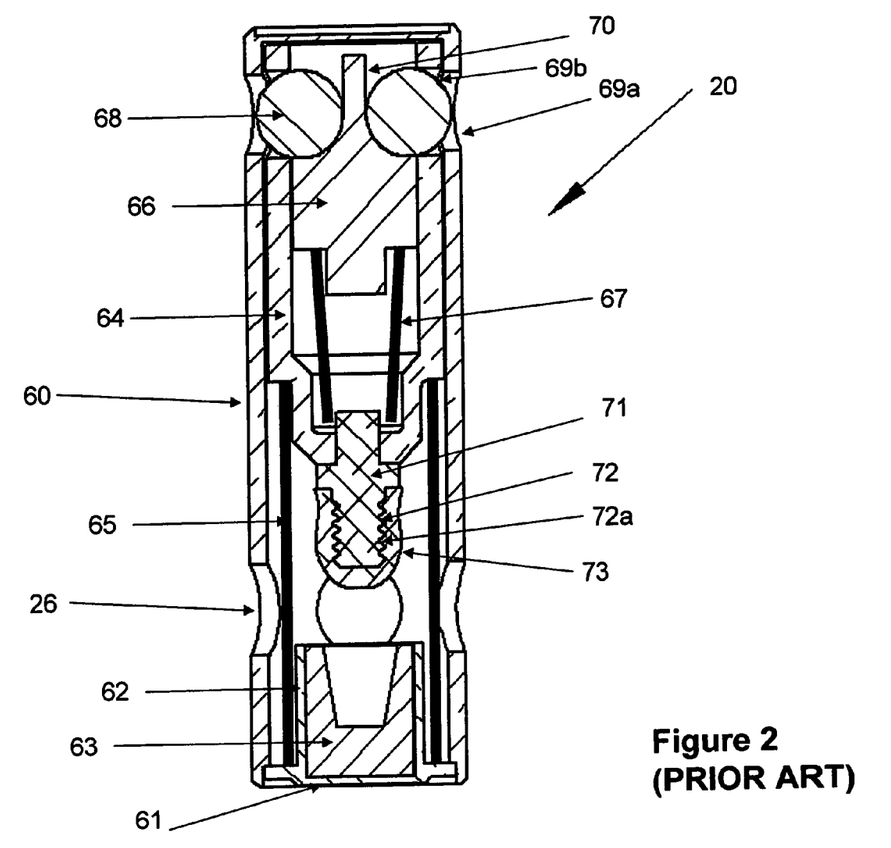
FIG. 2 illustrates a schematic of a cross-section of a conventional inertial igniter assembly known in the art.
Figure 3:
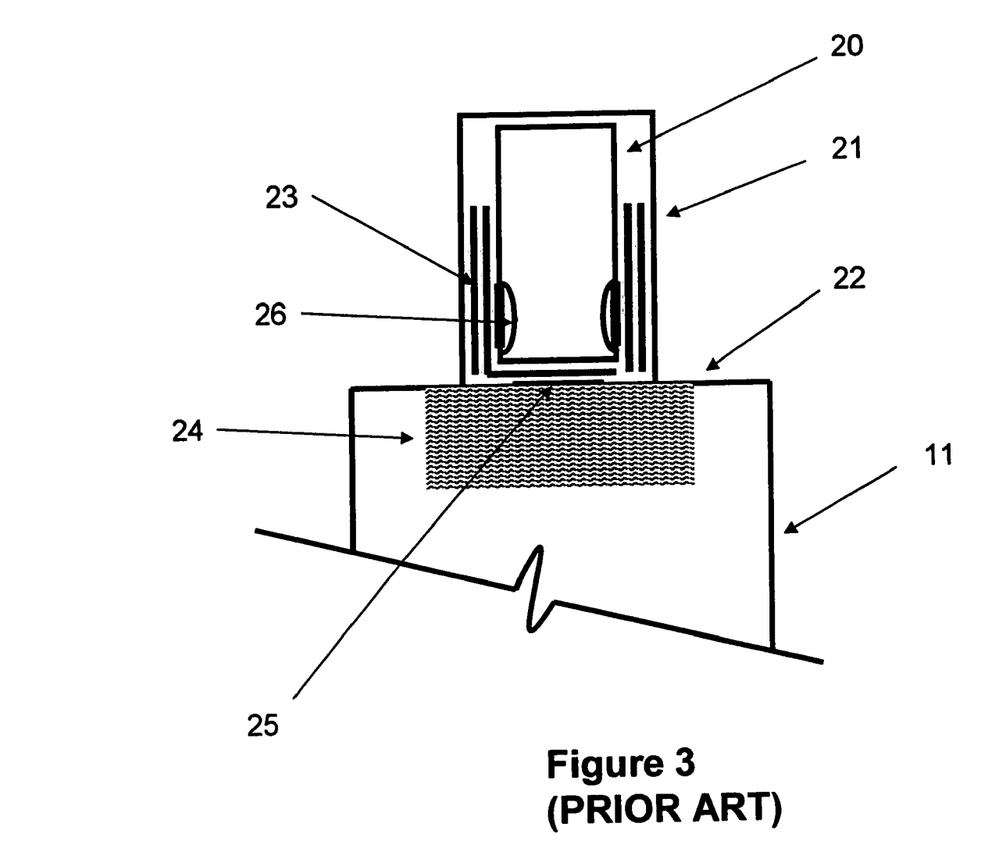
FIG. 3 illustrates a schematic of a cross-section of a conventional inertial igniter assembly known in the art positioned within a housing and having intermediate materials for ignition.

With currently available inertial igniters (produced by Eagle Pitcher Technologies, LLC), a schematic of which is shown in FIG. 2, the inertial igniter 20 has to be positioned within a housing 21 as shown in FIG. 3. The housing 21 and the thermal battery housing 11 may share a common cap 22, with the opening 25 to allow the ignition fire to reach the pyrotechnic material 24 within the thermal battery housing. As the inertial igniter is initiated, the sparks can ignite intermediate materials 23, which can be in the form of thin sheets to allow for easy ignition, which would in turn ignite the pyrotechnic materials 24 within the thermal battery through the access hole 25.

A schematic of a cross-section of a currently available inertial igniter 20 is shown in FIG. 2 in which the acceleration is in the upward direction (i.e., towards the top of the paper). The igniter has side holes 26 to allow the ignition fire to reach the intermediate materials 23 as shown in FIG. 3, which necessitate the need for its packaging in a separate housing, such as in the housing 21. The currently available inertial igniter 20 is constructed with an igniter body 60. Attached to the base 61 of the housing 60 is a cup 62, which contains one part of a two-part pyrotechnic compound 63 (e.g., potassium chlorate). The housing 60 is provided with the side holes 26 to allow the ignition fire to reach the intermediate materials 23 as shown in FIG. 3. A cylindrical shaped part 64, which is free to translate along the length of the housing 60, is positioned inside the housing 60 and is biased to stay in the top portion of the housing as shown in FIG. 2 by the compressively preloaded helical spring 65 (shown schematically as a heavy line). A turned part 71 is firmly attached to the lower portion of the cylindrical part 64. The tip 72 of the turned part 71 is provided with cut rings 72a, over which is covered with the second part of the two-part pyrotechnic compound 73 (e.g., red phosphorous).

A safety component 66, which is biased to stay in its upper most position as shown in FIG. 2 by the safety spring 67 (shown schematically as a heavy line), is positioned inside the cylinder 64, and is free to move up and down (axially) in the cylinder 64. As can be observed in FIG. 2, the cylindrical part 64 is locked to the housing 60 by setback locking balls 68. The setback locking balls 68 lock the cylindrical part 64 to the housing 60 through holes 69a provided on the cylindrical part 64 and the housing 60 and corresponding holes 69b on the housing 60. In the illustrated configuration, the safety component 66 is pressing the locking balls 68 against the cylindrical part 64 via the preloaded safety spring 67, and the flat portion 70 of the safety component 66 prevents the locking balls 68 from moving away from their aforementioned locking position. The flat portion 70 of the safety component 66 allows a certain amount of downward movement of the safety component 66 without releasing the locking balls 68 and thereby allowing downward movement of the cylindrical part 64. For relatively low axial acceleration levels or higher acceleration levels that last a very short amount of time, corresponding to accidental drops and other similar situations that cause safety concerns, the safety component 66 travels up and down without releasing the cylindrical part 64. However, once the firing acceleration profiles are experienced, the safety component 66 travels downward enough to release balls 68 from the holes 69b and thereby release the cylindrical part 64. Upon the release of the safety component 66 and appropriate level of acceleration for the cylindrical part 64 and all other components that ride with it to overcome the resisting force of the spring 65 and attain enough momentum, then it will cause impact between the two components 63 and 73 of the two-part pyrotechnic compound with enough strength to cause ignition of the pyrotechnic compound.

The aforementioned currently available inertial igniters have a number of shortcomings for use in thermal batteries, specifically, they are not useful for relatively small thermal batteries for munitions with the aim of occupying relatively small volumes, i.e., to achieve relatively small height total igniter compartment height 13, FIG. 1. Firstly, the currently available inertial igniters, such as that shown in FIG. 2 are relatively long thereby resulting in relatively long total igniter heights 13. Secondly, since the currently available igniters are not sealed and exhaust the ignition fire out from the sides, they have to be packaged in a housing 21, usually with other ignition material 23, thereby increasing the height 13 over the length of the igniter 20 (see FIG. 3). In addition, since the pyrotechnic materials of the currently available igniters 20 are not sealed inside the igniter, they are prone to damage by the elements and cannot usually be stored for long periods of time before assembly into the thermal batteries unless they are stored in a controlled environment.

SUMMARY OF THE INVENTION

A need therefore exists for the development of novel miniature inertial igniters for thermal batteries used in gun fired munitions, particularly for small and low power thermal batteries that could be used in fuzing and other similar applications, thereby eliminating the need for external power sources. The development of such novel miniature inertial ignition mechanism concepts also requires the identification or design of appropriate pyrotechnics. The innovative inertial igniters can be scalable to thermal batteries of various sizes, in particular to miniaturized igniters for small size thermal batteries. Such inertial igniters must be safe and in general and in particular they should not initiate if dropped, e.g., from up to 7 feet onto a concrete floor for certain applications; should withstand high firing accelerations, for example up to 20-50, 000 Gs; and should be able to be designed to ignite at specified acceleration levels when subjected to such accelerations for a specified amount of time to match the firing acceleration experienced in a gun barrel as compared to high G accelerations experienced during accidental falls which last over very short periods of time, for example accelerations of the order of 1000 Gs when applied for 5 msec as experienced in a gun as compared to for example 2000 G acceleration levels experienced during accidental fall over a concrete floor but which may last only 0.5 msec. Reliability is also of much concern since the rounds should have a shelf life of up to 20 years and could generally be stored at temperatures of sometimes in the range of −65 to 165 degrees F. This requirement is usually satisfied best if the igniter pyrotechnic is in a sealed compartment. The inertial igniters must also consider the manufacturing costs and simplicity in design to make them cost effective for munitions applications.

To ensure safety and reliability, inertial igniters should not initiate during acceleration events which may occur during manufacture, assembly, handling, transport, accidental drops, etc. Additionally, once under the influence of an acceleration profile particular to the firing of ordinance from a gun, the device should initiate with high reliability. In many applications, these two requirements often compete with respect to acceleration magnitude, but differ greatly in impulse. For example, an accidental drop may well cause very high acceleration levels—even in some cases higher than the firing of a shell from a gun. However, the duration of this accidental acceleration will be short, thereby subjecting the inertial igniter to significantly lower resulting impulse levels. It is also conceivable that the igniter will experience incidental low but long-duration accelerations, whether accidental or as part of normal handling, which must be guarded against initiation. Again, the impulse given to the miniature inertial igniter will have a great disparity with that given by the initiation acceleration profile because the magnitude of the incidental long-duration acceleration will be quite low.

Those skilled in the art will appreciate that the inertial igniters disclosed herein may provide one or more of the following advantages over prior art inertial igniters:

provide inertial igniters that are significantly shorter than currently available inertial igniters for thermal batteries or the like, particularly relatively small thermal batteries to be used in munitions without occupying very large volumes;

provide inertial igniters that can be mounted directly onto the thermal batteries without a housing (such as housing 21 shown in FIG. 3), thereby allowing even a smaller total height for the inertial igniter assembly;

provide inertial igniters that can directly initiate the pyrotechnics materials inside the thermal battery without the need for intermediate ignition material (such as the additional material 23 shown in FIG. 3) or a booster;

provide inertial igniters that allow the use of standard off-the-shelf percussion cap primers instead of specially designed pyrotechnic components; and provide inertial igniters that can be sealed to simplify storage and increase their shelf life.

Accordingly, an inertial igniter for use with a thermal battery for producing power upon acceleration is provided. The inertial igniter comprising: a first member having a wall defining an internal cavity; a second member disposed on one of the internal cavity and an exterior surface of the wall, the second member being slidable relative to the first member and having one of a striker and a first pyrotechnic material disposed thereon, the second member further having a first concave portion; a third member disposed on the other of the internal cavity and an exterior surface of the wall, the third member being slidable relative to the first member, the third member having a second concave portion; a first biasing means for biasing the second member in a direction opposite the acceleration; a second biasing means for biasing the third member in the direction opposite the acceleration; one or more locking balls each having a portion thereof disposed in the first concave portion and another portion thereof disposed in the second concave portion for preventing relative movement of the second and third members with the first member when an acceleration time profile is below a predetermined threshold; and one of a percussion cap primer and a second pyrotechnic material disposed on the first member; wherein when the acceleration time profile is greater than the predetermined threshold the one or more locking balls are released from one or more of the first concave portion and the second concave portion to first permit relative movement of the third member with the first member and after a time delay to permit relative movement of the second member with the first member such that the one of the striker and the first pyrotechnic material strikes the one of the percussion cap primer and the second pyrotechnic material.

The first member can further have an opening for allowing an ignition fire resulting from the striking of the one of the striker and the first pyrotechnic material with the one of the percussion cap primer and the second pyrotechnic material to exit therethrough.

The inertial igniter can further comprise a housing portion connected to the first member for enclosing the second and third members. The housing can comprise a wall portion and a top portion. The top portion can be sealed to the wall portion to seal the internal cavity from an exterior of the housing.

The wall, second member and third member can be circular in cross-section.

The first concave portion can be one of a groove or dimple formed on an outer surface of the second member. The second concave portion can be a shoulder formed on an inner surface of the third member.

The first member can include a cup for holding the one of the percussion cap primer and the second pyrotechnic material. The second member can comprise a bore and the striker can be disposed in the bore. The second member can comprise a central element for holding the first pyrotechnic material. The central element can further have one or more cut ring portions for facilitating the holding of the first pyrotechnic material.

Also provided is an inertial igniter and thermal battery assembly for producing power upon acceleration. The assembly comprising: an inertial igniter comprising: a first member having a wall defining an internal cavity; a second member disposed on one of the internal cavity and an exterior surface of the wall, the second member being slidable relative to the first member and having one of a striker and a first pyrotechnic material disposed thereon, the second member further having a first concave portion; a third member disposed on the other of the internal cavity and an exterior surface of the wall, the third member being slidable relative to the first member, the third member having a second concave portion; a first biasing means for biasing the second member in a direction opposite the acceleration; a second biasing means for biasing the third member in the direction opposite the acceleration; one or more locking balls each having a portion thereof disposed in the first concave portion and another portion thereof disposed in the second concave portion for preventing relative movement of the second and third members with the first member when an acceleration time profile is below a predetermined threshold; and one of a percussion cap primer and a second pyrotechnic material disposed on the first member; wherein when the acceleration time profile is greater than the predetermined threshold the one or more locking balls are released from one or more of the first concave portion and the second concave portion to first permit relative movement of the third member with the first member and after a time delay to permit relative movement of the second member with the first member such that the one of the striker and the first pyrotechnic material strikes the one of the percussion cap primer and the second pyrotechnic material; and a thermal battery having a third pyrotechnic material and operatively connected to the inertial igniter such that an ignition fire resulting from the striking of the one of the striker and the first pyrotechnic material with the one of the percussion cap primer and the second pyrotechnic material ignites the third pyrotechnic material.

The inertial igniter and the thermal battery can each have an opening such that the ignition fire can communicate with the third pyrotechnic material through the openings.

The inertial igniter can further comprise a housing portion connected to the first member for enclosing the second and third members. The housing can comprise a wall portion and a top portion. The top portion can be sealed to the wall portion to seal the internal cavity from an exterior of the housing.

The wall, second member and third member can be circular in cross-section.

The first concave portion can have one of a groove or dimple formed on an outer surface of the second member. The second concave portion can have a shoulder formed on an inner surface of the third member. The first member can include a cup for holding the one of the percussion cap primer and the second pyrotechnic material. The second member can comprises a bore and the striker can be disposed in the bore. The second member can comprises a central element for holding the first pyrotechnic material. The central element can further have one or more cut ring portions for facilitating the holding of the first pyrotechnic material.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

Figure 4:
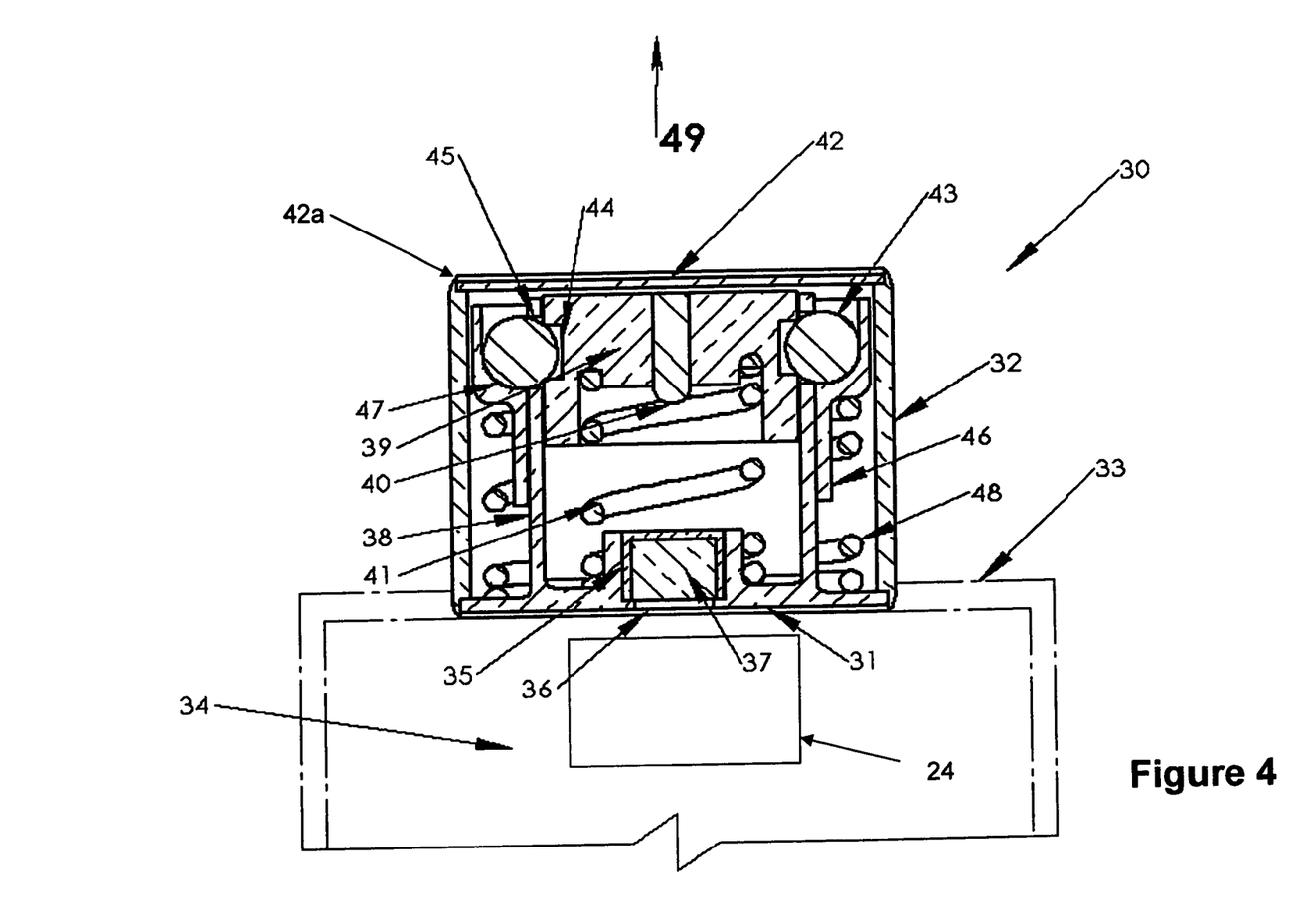
FIG. 4 illustrates a schematic of a cross-section of a first embodiment of a inertial igniter in a locked position.

A schematic of a cross-section of a first embodiment 30 of an inertia igniter is shown in FIG. 4, referred to generally with reference numeral 30. The inertial igniter 30 is constructed with an igniter body 31 and a housing wall 32. In the schematic of FIG. 4, the igniter body 31 and the housing wall 32 are joined together at one end; however, the two components may be integrated as one piece. In addition, the base of the housing 31 may be extended to form the cap 33 of the thermal battery 34, the top portion of which is shown with dashed lines in FIG. 4. The base of the housing 31 is provided with a recess 35 to receive the percussion cap primer 37. The base of the housing 31 is also provided with the opening 36 within the recess 35 to allow the ignited sparks and fire to exit the primer 37 into the thermal battery 34 upon initiation of the percussion cap primer 37. The internal components of the inertial igniter 30 are sealed by a cap 42 which can be brazed or welded at seam 42a or applied with a suitable adhesive.

Integral to the igniter housing 31 is a cylindrical part 38 (or bodies with other cross-sectional shapes) having a wall defining a cavity, within which a striker mass 39 can travel up and down. The striker mass 39 is however biased to stay in its upper most position as shown in FIG. 4 by a striker spring 41. In its illustrated position, the striker mass 39 is locked in its axial position to the cylindrical part 38 of the housing 31 of the inertial igniter 30 by at least one locking ball 43. The setback locking ball 43 locks the striker mass 39 to the cylindrical part 38 of the housing 31 through the holes 45 provided on the cylindrical part 38 of the housing 31 and a concave portion such as a groove (or dimple) 44 on the striker mass 39 as shown in FIG. 4. In the configuration shown in FIG. 4, the locking balls 43 are prevented from moving away from their aforementioned locking position by the cylindrical setback collar 46. The cylindrical setback collar 46 can ride on the outer surface of the cylindrical part 38 of the housing 31, but is biased to stay in its upper most position as shown in the schematic of FIG. 4 by the setback spring 48. The cylindrical setback collar 46 has a concave portion such as an upper enlarged shoulder portion 47, within which the locking balls 43 loosely fit and are kept in their aforementioned position locking the striker mass 39 to the cylindrical part 38 of the housing 31. The striker mass 39 has a tip 40, which upon release of the striker mass and appropriate level of acceleration for the striker mass 39 to overcome the resisting force of the striker spring 41 and strike the percussion cap primer 37 with enough momentum, would initiate the percussion cap primer 37. This tip 40 will have a form appropriate to reliably initiate the percussion cap primer, such as being spherical or hemispherical in shape.

The basic operation of the disclosed inertial igniter 30 will now be described with reference to FIGS. 4-6. Any non-trivial acceleration in the axial direction 49 which can cause the cylindrical setback collar 46 to overcome the resisting force of the setback spring 48 will initiate and sustain some downward motion of only the setback collar 46. The force due to the acceleration on the striker mass 39 is supported by the locking balls 43 which are constrained by the shoulder 47 of the setback collar 46 to engage the striker mass.

If an acceleration time in the axial direction 49 imparts a sufficient impulse to the setback collar 46 (i.e., if an acceleration time profile is greater than a predetermined threshold), it will translate down along the axis of the assembly until the setback locking balls 43 are no longer constrained to engage the striker mass 39 to the cylindrical part 38 of the housing 31. If the acceleration event is not sufficient to provide this motion (i.e., the acceleration time profile is less than the predetermined threshold), the setback collar will return to its start position under the force of the setback spring. The schematic of the inertial igniter 30 with the setback collar 46 moved down certain distance as a result of an acceleration event, which is not sufficient to unlock the striker mass 39 from the cylindrical part 38 of the housing 31, is shown in FIG. 5.

Assuming that the acceleration time profile was at or above the specified "all-fire" profile, the setback collar 46 will have translated down full-stroke, allowing the striker mass 39 to accelerate down towards the percussion cap primer 37. In such a situation, since the locking balls 43 are no longer constrained by the shoulder 42 of the setback collar 46, the downward force that the striker mass 39 has been exerting on the locking balls 43 will force the locking balls 43 to move in the radial direction toward the housing wall 32. Once the locking balls 43 are tangent to the outermost surface of the striker mass 39, the downward motion of the striker mass 39 is impeded only by the elastic force of the striker spring 41, which is easily overcome by the impulse provided to the striker mass 39. As a result, the striker mass 39 moves downward, causing the tip 40 of the striker mass 39 to strike the target percussion cap primer 37 with the requisite energy to initiate ignition. The latter configuration of the inertial igniter 30 when the sharp tip 40 of the striker mass 39 is striking the primer 37 is shown in the schematic of FIG. 6.

The striker mass 39 and tip 40 may be a monolithic design with the striking tip 40 being a machined boss protruding from the striker mass, or the tip may be a separate piece pressed or otherwise permanently fixed to the striker mass. A two-piece design would be favorable to the need for a striker whose density is different than steel, but whose tip would remain hard and tough by attaching a steel ball, hemisphere, or other shape to the striker mass. A monolithic design, however, would be generally favorable to manufacturing because of the reduction of part quantity and assembly operations.

In another embodiment, the striker mass 39 is pre-loaded downwards by a tensile force in the striker spring 41, in which case must be fixed at both ends to the striker mass 39 and the base of the inertial igniter body 31, to force the striker mass 39 towards the percussion cap primer 37 upon its release. Alternatively, an elastic element such as a spring (not shown), which is preloaded in compression, can be positioned between the striker mass 39 and the top cap 42 of the inertial igniter 30. As a result, the striker mass 39, upon its release, is forced down towards the percussion cap primer 37, thereby requiring a shorter travel distance to achieve a desired velocity, i.e., momentum. As a result, an inertial igniter that is shorter, lighter and more compact than the one shown in FIGS. 2 and 3 is obtained. This embodiment therefore allows the construction of an inertial igniter with a lighter striking mass 39 and a closer striker tip 40 to the percussion cap primer 37, thereby a smaller required height 13 (see FIG. 1). In addition, inertial igniters may even be constructed without a striker spring 41.

In yet another embodiment, the setback collar 46 may be constructed with an integrated elastic element, e.g., as part of its lower sliding section extending to the base of the igniter body 31 (not shown) to function as the setback spring 48. This would simplify the manufacture and assembly of the inertial igniter and reduce the number of required parts.

In the schematic of FIG. 4, the percussion cap is shown to be fitted from the top of the assembly before the striker spring 41 and the striker mass 39 is installed and secured to the safety system. The intent is to guard against the possibility of the percussion cap being pushed out of the assembly during acceleration or initiation striking. The percussion cap may, however, be assembled from the bottom side of the inertial igniter assembly as the final assembly operation, thereby reducing the possibility of accidental ignition. In addition, inertial igniter assemblies without percussion caps could then be stored indefinitely, having the desired percussion cap applied as usage becomes imminent.

It is appreciated by those familiar with the art that by varying the mass of the striker 39, the mass of the setback collar 46, the spring rates of the striker spring 41 and setback spring 48, the distance that the setback collar 46 has to travel downward to release setback locking balls and thereby release the striker mass 39, and the distance between the striker tip 40 and the percussion cap primer, the designer of the disclosed inertial igniter 30 can match the fire and no-fire impulse level requirements for various applications as well as the safety (delay or dwell action) protection against accidental dropping of the inertial igniter and/or the munitions within which it is assembled.

Briefly, the safety system parameters, i.e., the mass of the setback collar 46, the spring rate of the setback spring 48 and the dwell stroke (the distance that the setback collar 46 has to travel downward to release the setback locking balls and thereby release the striker mass 39) must be tuned to provide the required actuation performance characteristics. Similarly, to provide the requisite impact energy, the mass of the striker 39, the spring rate of the striker spring 41, the radius of striker tip 40, and the separation distance from the striker tip 40 to the percussion cap primer 37 must work together to provide the specified impact energy to the primer when subjected to the remaining portion of the prescribed initiation acceleration profile after the safety system has been actuated.

In addition, since the safety and striker systems each require a certain actuation distance to achieve the necessary performance, the most axially compact design is realized by nesting the two systems in parallel as it is done in the embodiment of FIG. 4. It is this nesting of the two safety and striker systems that allows the height of the disclosed inertial igniter to be significantly shorter than the currently available inertial igniter design (as shown in FIG. 2), in which the safety and striker systems are configured in series. In fact, an initial prototype of the disclosed inertial igniter 30 has been designed to the fire and no-fire and safety specifications of the currently available inertial igniter shown in FIG. 2 and has achieved a height reduction of about 44 percent. It is noted that by optimizing the parameters of the disclosed inertial igniter, its height can be further reduced.

Figure 7:
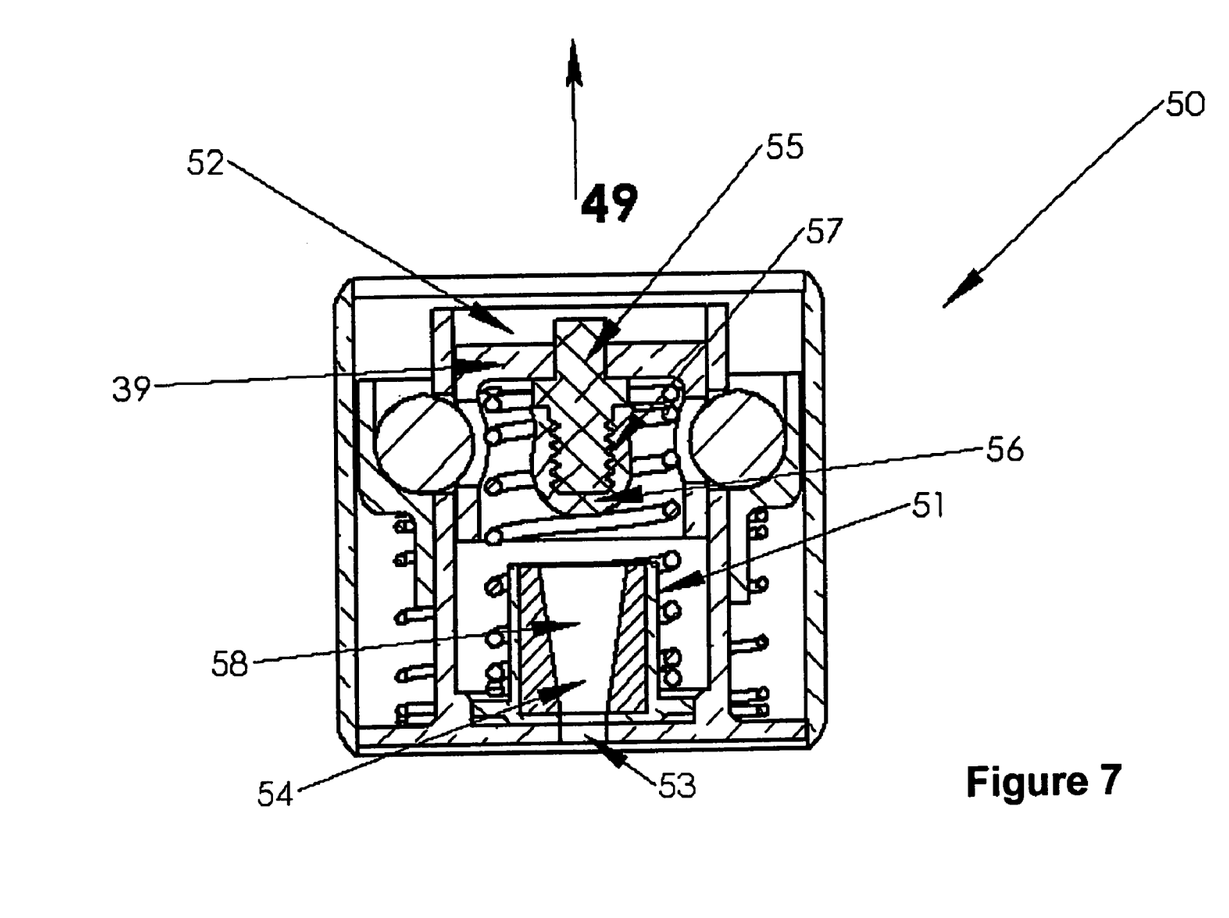
FIG. 7 illustrates a schematic of a cross-section of a second embodiment of an inertial igniter in a locked position.

In another embodiment, the percussion cap primer is replaced by a two-part pyrotechnic material combination that ignite upon the coincident impact of the two components (fuel and oxidizer). A schematic of a cross-section of the resulting inertial igniter 50 is shown in FIG. 7. In this illustration, all components are the same as those shown in FIG. 4 with the exception of the replaced percussion cap primer 37 with the cup 51 and the striker tip 40 with striker assembly 52. The cup 51 is provided with a bottom hole 53 and contains one component of the pyrotechnic material 54, preferably leaving a center opening 58 to allow the ignition spark and fire to easily exit and enter the thermal battery. The striker assembly 52 consists of a central element 55, which is firmly attached to the striker mass 39. The extended portion of the element 55 is provided with cuts 57 (shown as rings in FIG. 7), to which the second part of the pyrotechnic materials 56 is firmly adhered. The striker assembly 52 is also provided with a cap portion, which is intended to loosely cover the top portion of the cup 51 as the striker portion of the pyrotechnic material 56 impacts the cup portion 54.

In general, various combinations of pyrotechnic materials may be used for this purpose. One commonly used pyrotechnic material consists of red phosphorous or nano-aluminum, indicated as element 56 in FIG. 7, and is used with an appropriate binder (such as vinyl alcohol acetate resin or nitrocellulose) to firmly adhere to the striker surface 57. The second component can be potassium chlorate, potassium nitrate, or potassium perchlorate, indicated as element 54 in FIG. 7, and is used with a binder (preferably but not limited to with such as vinyl alcohol acetate resin or nitrocellulose) to firmly attach the compound to the inside of the cup 51 as shown in FIG. 7.

An advantage of using the two component pyrotechnic materials as shown in FIG. 7 is that these materials can be selected such that ignition is provided at significantly lower impact forces than are required for commonly used percussion cap primers. As a result, the amount of distance that the striker mass 39 has to travel and its required mass is thereby reduced, resulting in a smaller total height (shown as 15 in FIG. 1) of the thermal battery assembly. This choice, however, has the disadvantage of not using standard and off-the-shelf percussion cap primers, thereby increasing the component and assembly cost of the inertial igniter. Another advantage of this embodiment is directing the pyrotechnic output via a bottom hole 53 to reduce the cup size or volume.

Figure 5:
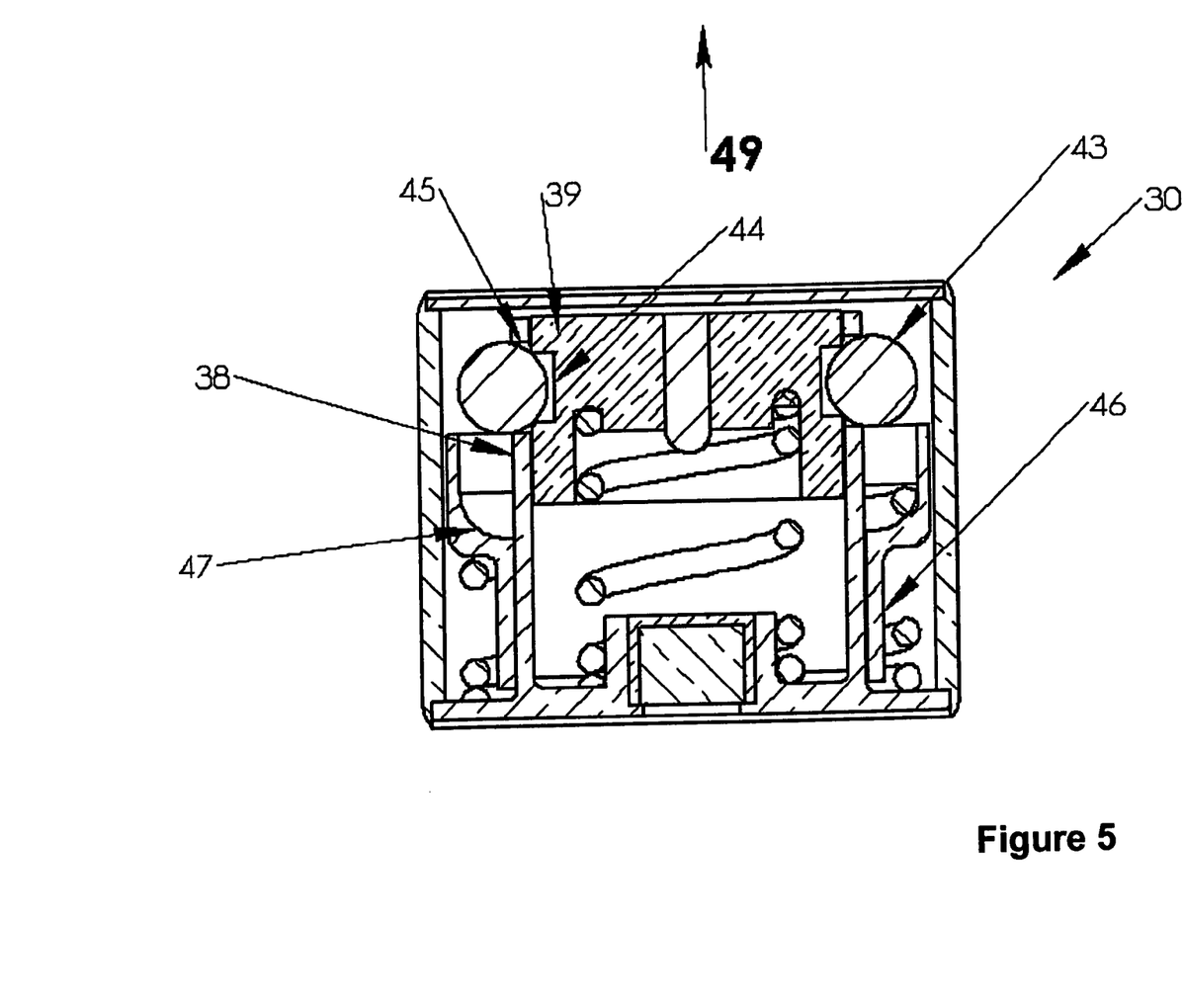
FIG. 5 illustrates the schematic of the inertial igniter of FIG. 4 upon a non-firing accidental acceleration.
Figure 6:
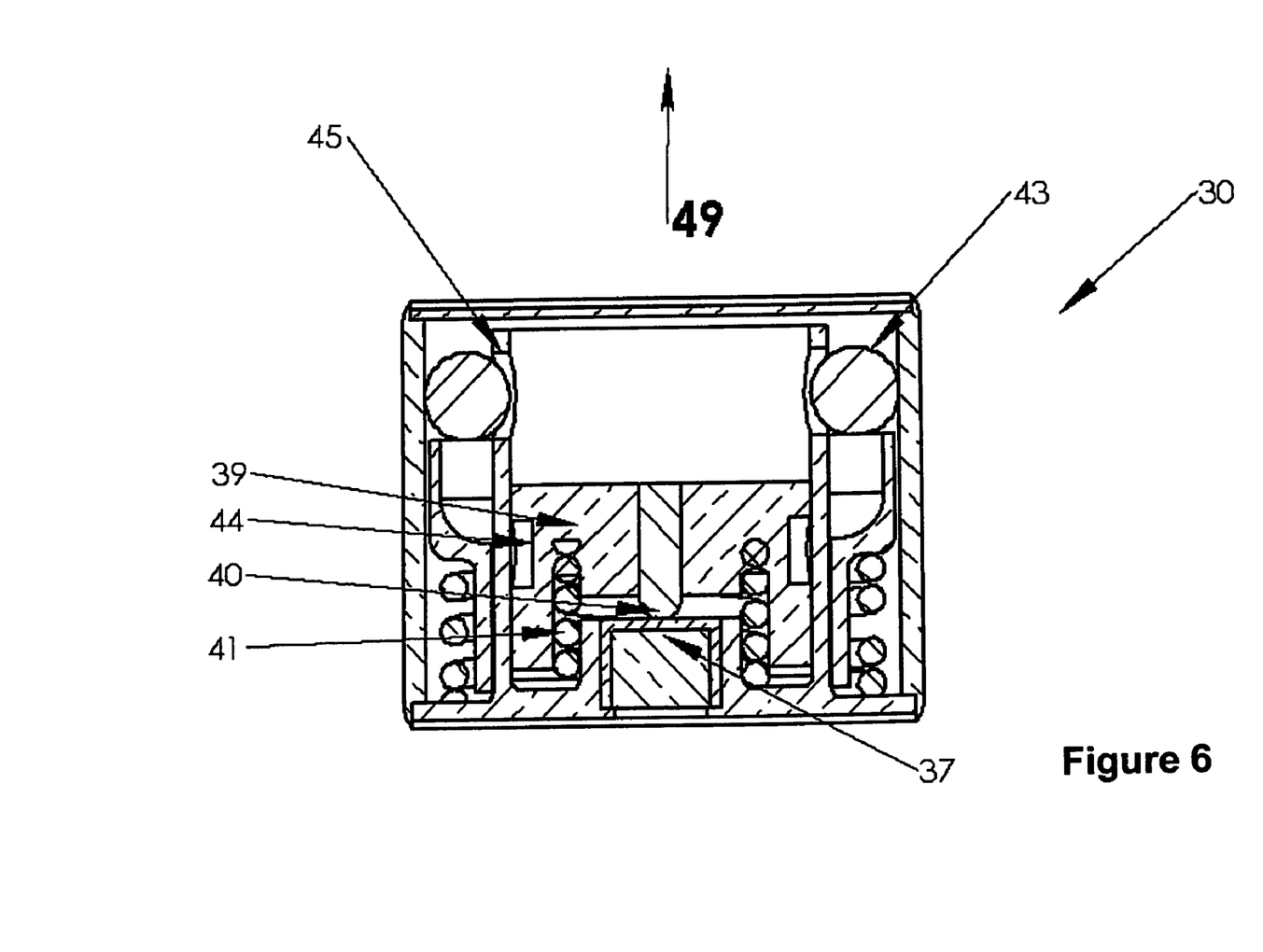
FIG. 6 illustrates the schematic of the inertial igniter of FIG. 4 upon a firing acceleration.

The disclosed inertial igniters are seen to discharge the ignition fire and sparks directly into the thermal battery, FIGS. 4-6, to ignite the pyrotechnic materials 24 within the thermal battery 34 (FIG. 4). As a result, the additional housing 21 and ignition material 23 shown in FIG. 3 can be eliminated, greatly simplifying the resulting thermal battery design and manufacture. In addition, the total height 13 of the inertial igniter assembly 10 and the total height 15 of the complete thermal battery assembly 16 are reduced, thereby reducing the total volume that has to be allocated in munitions to house the thermal battery.

The base of the disclosed igniter body 31 may be extended to form the cap 33 of the thermal battery 34. As a result, the total height of the inertial igniter and thermal battery assembly 15 (FIG. 1) can be further reduced.

The disclosed inertial igniters are shown sealed within their housing, thereby simplifying their storage and increase their shelf life.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An inertial igniter for use with a thermal battery for producing power upon acceleration, the inertial igniter comprising:
    a first member having a wall defining an internal cavity;
    a second member disposed on one of the internal cavity and an exterior surface of the wall, the second member being slidable relative to the first member and having one of a striker and a first pyrotechnic material disposed thereon, the second member further having a first concave portion;
    a third member disposed on the other of the internal cavity and an exterior surface of the wall, the third member being slidable relative to the first member, the third member having a second concave portion;
    a first biasing means for biasing the second member in a direction opposite the acceleration;
    a second biasing means for biasing the third member in the direction opposite the acceleration;
    one or more locking balls each having a portion thereof disposed in the first concave portion and another portion thereof disposed in the second concave portion for preventing relative movement of the second and third members with the first member when an acceleration time profile is below a predetermined threshold; and
    one of a percussion cap primer and a second pyrotechnic material disposed on the first member;
    wherein when the acceleration time profile is greater than the predetermined threshold the one or more locking balls are released from one or more of the first concave portion and the second concave portion to first permit relative movement of the third member with the first member and after a time delay to permit relative movement of the second member with the first member such that the one of the striker and the first pyrotechnic material strikes the one of the percussion cap primer and the second pyrotechnic material.

2. The inertial igniter of claim 1, wherein the first member further has an opening for allowing an ignition fire resulting from the striking of the one of the striker and the first pyrotechnic material with the one of the percussion cap primer and the second pyrotechnic material to exit therethrough for direct initiation of the pyrotechnic materials in the thermal battery.

3. The inertial igniter of claim 2, wherein the first part pyrotechnic material is one of red phosphorus and or nano-aluminum with vinyl alcohol acetate resin or nitrocellulose as binder and the second part of pyrotechnic material is one of potassium chlorate, potassium nitrate, and potassium perchlorate with vinyl alcohol acetate resin or nitrocellulose as binder.

4. The inertial igniter of claim 3, wherein the first and/or second pyrotechnic material include a binder.

5. The inertial igniter of claim 4, wherein the binder is one of vinyl alcohol acetate resin and nitrocellulose.

6. The inertial igniter of claim 1, further comprising a housing portion connected to the first member for enclosing the second and third members.

7. The inertial igniter of claim 6, wherein the housing comprises a wall portion and a top portion.

8. The inertial igniter of claim 7, wherein the top portion is sealed to the wall portion to seal the internal cavity from an exterior of the housing.

9. The inertial igniter of claim 1, wherein the wall, second member and third member are circular in cross-section.

10. The inertial igniter of claim 1, wherein the first concave portion is one of a groove or dimple formed on an outer surface of the second member.

11. The inertial igniter of claim 1, wherein the second concave portion is a shoulder formed on an inner surface of the third member.

12. The inertial igniter of claim 1, wherein the first member includes a cup for holding the one of the percussion cap primer and the second pyrotechnic material.

13. The inertial igniter of claim 1, wherein the second member comprises a bore and the striker is disposed in the bore.

14. The inertial igniter of claim 1, wherein the second member comprises a central element for holding the first pyrotechnic material.

15. The inertial igniter of claim 14, wherein the central element further has one or more cut ring portions for facilitating the holding of the first pyrotechnic material.

16. An inertial igniter and thermal battery assembly for producing power upon acceleration, the assembly comprising:
    an inertial igniter comprising:
        a first member having a wall defining an internal cavity;
        a second member disposed on one of the internal cavity and an exterior surface of the wall, the second member being slidable relative to the first member and having one of a striker and a first pyrotechnic material disposed thereon, the second member further having a first concave portion;
        a third member disposed on the other of the internal cavity and an exterior surface of the wall, the third member being slidable relative to the first member, the third member having a second concave portion;
        a first biasing means for biasing the second member in a direction opposite the acceleration;
        a second biasing means for biasing the third member in the direction opposite the acceleration;
        one or more locking balls each having a portion thereof disposed in the first concave portion and another portion thereof disposed in the second concave portion for preventing relative movement of the second and third members with the first member when an acceleration time profile is below a predetermined threshold; and one of a percussion cap primer and a second pyrotechnic material disposed on the first member;

wherein when the acceleration time profile is greater than the predetermined threshold the one or more locking balls are released from one or more of the first concave portion and the second concave portion to first permit relative movement of the third member with the first member and after a time delay to permit relative movement of the second member with the first member such that the one of the striker and the first pyrotechnic material strikes the one of the percussion cap primer and the second pyrotechnic material; and a thermal battery having a third pyrotechnic material and operatively connected to the inertial igniter such that an ignition fire resulting from the striking of the one of the striker and the first pyrotechnic material with the one of the percussion cap primer and the second pyrotechnic material ignites the third pyrotechnic material.

17. The assembly of claim 16, wherein the inertial igniter and the thermal battery each having an opening such that the ignition fire can communicate with the third pyrotechnic material through the openings.

18. The assembly of claim 16, wherein the inertial igniter further comprising a housing portion connected to the first member for enclosing the second and third members.

19. The assembly of claim 18, wherein the housing comprises a wall portion and a top portion.

20. The assembly of claim 19, wherein the top portion is sealed to the wall portion to seal the internal cavity from an exterior of the housing.

21. The assembly of claim 16, wherein the wall, second member and third member are circular in cross-section.

22. The assembly of claim 16, wherein the first concave portion is one of a groove or dimple formed on an outer surface of the second member.

23. The assembly of claim 16, wherein the second concave portion is a shoulder formed on an inner surface of the third member.

24. The assembly of claim 16, wherein the first member includes a cup for holding the one of the percussion cap primer and the second pyrotechnic material.

25. The assembly of claim 16, wherein the second member comprises a bore and the striker is disposed in the bore.

26. The assembly of claim 16, wherein the second member comprises a central element for holding the first pyrotechnic material.

27. The assembly of claim 26, wherein the central element further has one or more cut ring portions for facilitating the holding of the first pyrotechnic material.

* * * * *